United States Patent
Sugibayashi et al.

(10) Patent No.: US 7,903,205 B2
(45) Date of Patent: Mar. 8, 2011

(54) IMAGE DISPLAY DEVICE

(75) Inventors: Makiko Sugibayashi, Chiba (JP); Hiroshi Sasaki, Mito (JP); Yasushi Tomioka, Hitachinaka (JP)

(73) Assignee: Hitachi Displays, Ltd., Chiba-Ken (JP)

( * ) Notice: Subject to any disclaimer, the term of this patent is extended or adjusted under 35 U.S.C. 154(b) by 260 days.

(21) Appl. No.: 12/153,850

(22) Filed: May 27, 2008

(65) Prior Publication Data

US 2008/0297685 A1 Dec. 4, 2008

(30) Foreign Application Priority Data

May 28, 2007 (JP) .................. 2007-139978

(51) Int. Cl.
*G02F 1/1335* (2006.01)
(52) U.S. Cl. ................................. 349/96; 349/58
(58) Field of Classification Search .......... 349/96, 349/58
See application file for complete search history.

(56) References Cited

U.S. PATENT DOCUMENTS

| | | | |
|---|---|---|---|
| 5,453,864 A * | 9/1995 | Yamada et al. | 349/182 |
| 6,798,467 B2 | 9/2004 | Tasaki et al. | |
| 7,382,422 B2 * | 6/2008 | Niiyama et al. | 349/58 |
| 7,646,457 B2 * | 1/2010 | Fukagawa et al. | 349/122 |
| 2004/0042233 A1 * | 3/2004 | Suzuki et al. | 362/561 |
| 2007/0002211 A1 | 1/2007 | Sasaki et al. | |
| 2007/0046874 A1 * | 3/2007 | Adachi et al. | 349/122 |

FOREIGN PATENT DOCUMENTS

| | | |
|---|---|---|
| JP | 03-259119 | 11/1991 |
| JP | U 05-8540 | 2/1993 |
| JP | 06-051117 | 2/1994 |
| JP | 08-036151 | 2/1996 |
| JP | 09-033721 | 2/1997 |
| JP | 2002-287119 | 10/2002 |
| JP | 2007-041534 | 2/2007 |
| JP | 2007-047621 | 2/2007 |

* cited by examiner

*Primary Examiner* — David Nelms
*Assistant Examiner* — Phu Vu
(74) *Attorney, Agent, or Firm* — Antonelli, Terry, Stout & Kraus, LLP.

(57) ABSTRACT

An object of the present invention is to provide an image display device having a configuration that allows the device to be manufactured in such a way as to prevent unwanted spread and penetration of the polymeric precursor of the elastomer in its liquid display panel and thereby prevent the expansion and degradation of the members adjacent to the panel, which leads to an improvement in the performance of the image display device.

14 Claims, 10 Drawing Sheets

IMAGE DISPLAY DEVICE

BACKGROUND OF THE INVENTION

1. Field of the Invention

The present invention relates to an image display device including a liquid crystal panel and a transparent protective plate, or front panel, with a bonding material therebetween, wherein the liquid crystal panel is "voltage-controlled" to selectively transmit light from a backlight to display an image.

2. Description of the Related Art

In liquid crystal image display devices such as liquid crystal TVs, conventionally an image is displayed by applying a voltage to the liquid crystal layer while backlighting it in such a way that light of varying intensity emerges from the layer and passes through the color filter so that a desired color and intensity of light emerges from each pixel of the filter.

These image display devices include a backlight unit, a liquid crystal panel including the liquid crystal layer, etc., and a transparent protective plate, or front panel, for protecting the front surface of the liquid crystal panel. An elastomer (or elastic polymer) is used as a bonding material to bond the liquid crystal panel and the protective plate together. However, the prepolymeric precursor of the elastomer is a syrupy liquid with a low viscosity, meaning that it may spread to members adjacent to the liquid crystal panel if the bonding operation takes time.

JP-A-2002-287119 discloses a liquid crystal display device in which a silicone-based nonadhesive sheet having rubber-like elasticity is interposed between the liquid crystal display panel and the transparent protective plate, or front panel, such that one surface of the sheet is in close contact with the liquid crystal display panel and the other surface is in close contact with the transparent protective plate. It also discloses optimum surface roughness values, optimum rolling ball tack values, etc. for the surfaces of the silicone-based sheet. (See paragraphs [0020], [0023], [0030], [0064], etc.) On the other hand, JP-A-2007-041534 discloses that in an image display device the elastomer region (or bonding material) may spread to members adjacent to the panel (see paragraphs [0070], [0071], [0079], etc.).

Since, as described above, the prepolymeric precursor of the elastomer has a low viscosity, it may spread and adhere to the cut edges of the polarizing plates, etc. of the liquid crystal panel and to members adjacent to the liquid crystal panel if the bonding operation takes time.

If the prepolymer comes into contact with the cut edges of the polarizing plates, it may penetrate through the triacetyl cellulose (TAC) material making up the polarizing plates since triacetyl cellulose has large intermolecular spaces. This may lead to expansion of the polarizing plates. Further, iodine in the polarizing plates may leach out, resulting in reduced performance of the plates.

If the prepolymeric precursor of the elastomer contacts the conductive adhesive for bonding the LCD driver ICs, etc. to the glass substrates of the liquid crystal panel, the adhesive may swell resulting in poor adherence and conductivity.

Further, if the prepolymeric precursor of the elastomer comes into contact with the silicone coating agent for sealing the liquid crystal layer and the front and rear glass substrates of the liquid crystal panel (the liquid crystal layer being sandwiched between these glass substrates), the silicone coating agent may swell and may, at least to some extent, lose its sealing properties. This may cause the prepolymer to penetrate into the liquid crystal layer, resulting in the liquid crystal panel being unable to attain the desired performance.

The above JP-A-2007-041534 mentions that, in order to prevent the elastomer region from extending to the members adjacent to the liquid crystal panel, it is necessary to fully light cure the prepolymeric precursor of the elastomer.

The present invention has been devised in view of the above problems. It is, therefore, an object of the present invention to provide an image display device having a configuration that allows the device to be manufactured in such a way as to prevent unwanted spread and penetration of the prepolymeric precursor of the elastomer in its liquid crystal panel and thereby prevent the expansion and degradation of the members adjacent to the panel, which leads to an improvement in the performance of the image display device.

SUMMARY OF THE INVENTION

To accomplish the above object, a first aspect of the present invention provides an image display device comprising: a backlight unit; a liquid crystal panel for displaying an image on a display screen and including a rear polarizing plate, a pair of front and rear transparent glass substrates holding therebetween a liquid crystal layer, electrodes for applying a voltage to the liquid crystal layer, an alignment layer, and a color filter, and a front polarizing plate; a transparent protective plate; and a bonding layer disposed between and bonding the transparent protective plate and the liquid crystal panel; wherein the bonding layer is larger in area than the display area of the display screen and smaller in area than the front polarizing plate.

A second aspect of the present invention provides an image display device comprising: a backlight unit; a liquid crystal panel for displaying an image on a display screen and including a rear polarizing plate, a pair of front and rear transparent glass substrates holding therebetween a liquid crystal layer, electrodes for applying a voltage to the liquid crystal layer, an alignment layer, and a color filter, and a front polarizing plate; a transparent protective plate; and a bonding layer disposed between and bonding the transparent protective plate and the liquid crystal panel; wherein the front polarizing plate is formed such that an outer surface thereof in contact with the bonding layer has surface irregularities.

A third aspect of the present invention provides an image display device comprising: a backlight unit; a liquid crystal panel for displaying an image on a display screen and including a rear polarizing plate, a pair of front and rear transparent glass substrates holding therebetween a liquid crystal layer, electrodes for applying a voltage to the liquid crystal layer, an alignment layer, and a color filter, and a front polarizing plate; a transparent protective plate; and a bonding layer disposed between and bonding the transparent protective plate and the liquid crystal panel; wherein the protective plate is formed such that an outer surface thereof in contact with the bonding layer has surface irregularities.

Thus, the present invention provides image display devices having a configuration that allows them to be manufactured in such a way as to prevent unwanted spread and penetration of the prepolymeric precursor of the elastomer in their liquid crystal panel and thereby prevent the expansion and degradation of the members adjacent to the panel, which leads to an improvement in the performance of the image display devices.

BRIEF DESCRIPTION OF THE DRAWINGS

Other objects and advantages of the invention will become apparent from the following description of embodiments with reference to the accompanying drawings in which.

DETAILED DESCRIPTION OF THE PREFERRED EMBODIMENTS

Preferred embodiments of the present invention will be described with reference to the accompanying drawings.

Figure 1A:
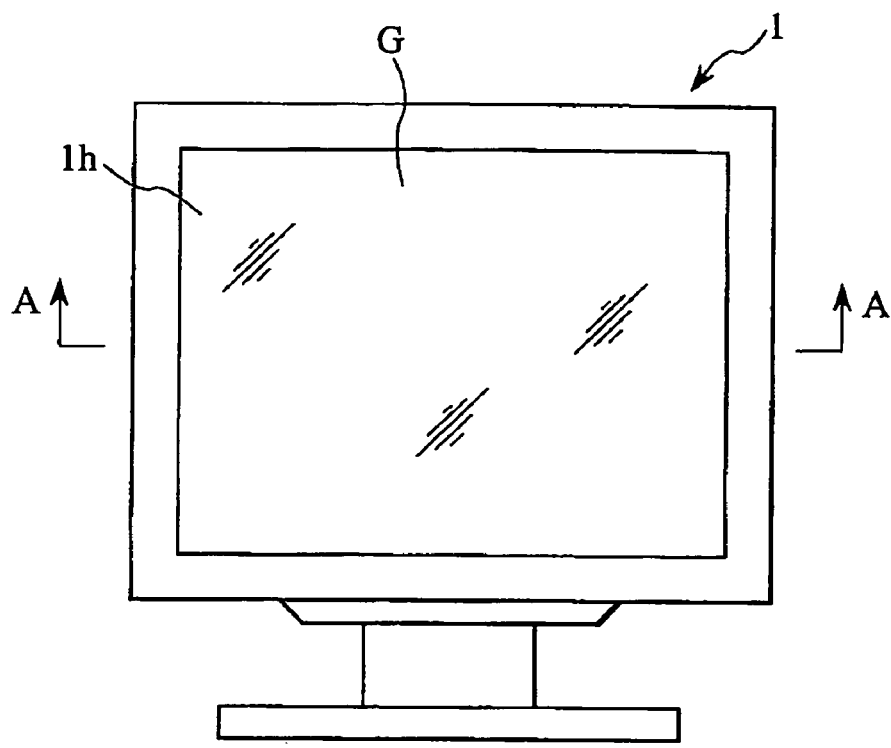
FIG. 1A is a front view of a liquid crystal TV according to the present invention.
Figure 1B:
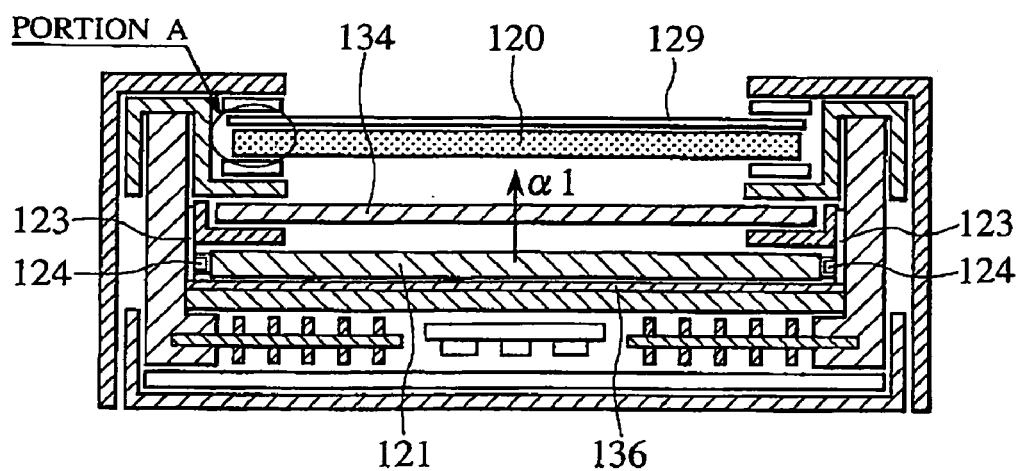
FIG. 1B is a schematic cross-sectional view taken along line A-A of FIG. 1A.

FIG. 1A is a front view of a liquid crystal TV (or image display device) 1 according to the present invention. This liquid crystal TV includes an image display unit 1h for displaying an image on the display screen G. In this image display unit 1h, a voltage is applied to the liquid crystal layer while backlighting it (or illuminating it from behind) in such a way that light of varying intensity emerges from the layer and passes through the color filter so that a desired color and intensity of light emerges from each pixel of the filter, thereby displaying an image on the display screen G. FIG. 1B is a schematic cross-sectional view taken along line A-A of FIG. 1A.

Specifically, as shown in FIG. 1B, the image display unit 1h includes: a liquid display panel 120 in which light is transmitted through the liquid crystal layer (not shown) from behind while a voltage corresponding to each pixel of an image is applied to the layer to display that image; a transparent abrasion-resistant protective plate 129 for protecting the liquid crystal panel 120; light source mounting substrates 123 (a backlight component) disposed on both sides of the image display unit 1h and having mounted thereon a light emitting diode 124 (a backlight component) for emitting light which is to be transmitted through the liquid crystal panel 120; a light guide plate 121 (a backlight component) for receiving the light from the light emitting diodes 124 on both sides and diffusing and thereby directing it toward the front as indicated by the arrow ◼1; a reflective sheet 136 (a backlight component) disposed on the rear side of the light guide plate 121 (i.e., the lower side of the plate as viewed in FIG. 1B) to receive escaped light and diffusely reflect it toward the front (as indicated by the arrow ◼1), the diffusely reflected light serving as backlight; and an optical sheet 134 (a backlight component) for receiving the light transmitted through the light guide plate 121 (i.e., the light reflected from the reflective sheet 136, etc.) and converting it into uniform light traveling toward the front (as indicated by the arrow ◼1).

It should be noted that the backlight unit shown in FIG. 1B is a side backlight using the light emitting diodes 124 as light sources, that is, the light emitted from the light emitting diodes 124 is directed toward the liquid crystal panel 120 by the light guide plate 121. However, the present invention does not require that the light sources be light emitting diodes. For example, light sources used in common liquid crystal display devices, such as cold cathode fluorescent lamps, may be substituted. Further, as in conventional liquid crystal TVs, the backlight unit may include a plurality of cold cathode fluorescent lamps in the place of and instead of the light guide plate 121 shown in FIG. 1B.

First Embodiment

Figure 2:
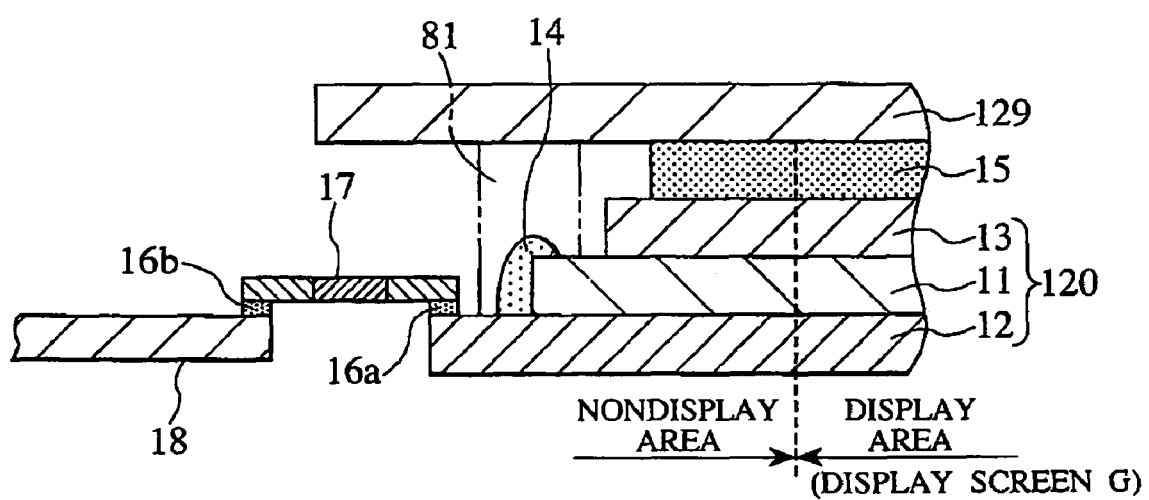
FIG. 2 is an enlarged conceptual view of a portion A of FIG. 1B according to a first embodiment of the present invention.

A first embodiment of the present invention will be described with reference to FIG. 2, which is an enlarged conceptual view of a portion A of FIG. 1B.

The liquid crystal panel 120 includes a pair of front and rear transparent glass substrates 11 and 12 which sandwich therebetween the following components (not shown): a liquid crystal layer; a electrode structure for applying an electric field to the liquid crystal layer; various insulating films; an alignment layer; and a color filter which receives light of varying intensity from the liquid crystal layer and transmits it therethrough so that a desired color and intensity of light emerges from each pixel of the filter. The liquid crystal panel 120 further includes: a rear polarizing plate (not shown) which is disposed on the rear side of the rear glass substrate 12 (i.e., the lower side of the substrate as viewed in FIG. 1B and FIG. 2) and which allows light to pass only in one direction; and a front polarizing plate 13 which is disposed on the front side of the front glass substrate 11 (i.e., the upper side of the substrate as viewed in FIG. 1B and FIG. 2) and which allows light to pass only in one direction and has a polarizing axis perpendicular that of the rear polarizing plate.

The liquid crystal panel 120 also includes a silicone coating agent 14 applied to the joined edge portions of the front and rear glass substrates 11 and 12 so as to seal the liquid crystal layer, etc. therebetween. This silicone coating agent 14 prevents leakage of liquid crystal material from between the front and rear glass substrates 11 and 12, as well as preventing foreign particles from entering the liquid crystal layer.

An elastomer (or bonding layer) 15, which is an organic medium, is provided between the liquid crystal panel 120 and a protective plate, or front panel, 129, which forms the front surface of the liquid crystal TV 1. More specifically, the elastomer 15 is formed along substantially the entire interface between the liquid crystal panel 120 and the protective plate 129 by light curing to bond the protective plate 129 to the liquid crystal panel 120. It should be noted that the liquid crystal panel 120 and the protective plate 129 have a rectangular plate-like shape.

The elastomer 15 (or elastomer region) covers and extends beyond the display area (corresponding to the display screen G shown in FIG. 1A). (In FIG. 2, the border between the display area and the nondisplay area is indicated by the broken line.) It should be noted that the elastomer region does not entirely cover the front polarizing plate 13, that is, the front polarizing plate 13 extends beyond the elastomer region.

The elastomer 15 serves to bond the protective plate 129 to the liquid crystal panel 120 and to enhance the impact resistance of the liquid crystal panel 120. Further, the elastomer 15 prevents the rear surface of the protective plate 129 from reflecting light. Without the elastomer 15, air may be present between the protective plate 129 and the liquid crystal panel 120, resulting in the rear surface of the protective plate 129 reflecting light due to the difference in refractive index between the air and the protective plate 129. The elastomer 15 is made of a light curing material and is transparent and light-resistant. An acrylic monomer, prepolymer, etc. is used as its precursor. Further, the elastomer 15 has appropriate flexibility, since it contains a phthalate ester plasticizer, an adipate ester plasticizer, etc.

On the rear glass substrate 12 of the liquid crystal panel 120 are disposed liquid crystal electrodes and wiring pattern (not shown) which are connected to each other. The wiring pattern is connected through a conductive film 16a of a conductive adhesive to a flexible wiring substrate 17 having LCD driver ICs mounted thereon, as shown in FIG. 2. Further, the flexible wiring substrate 17 is connected through a conductive film 16b of a conductive adhesive to a printed wiring board 18 having control circuitry mounted thereon.

Thus, according to the first embodiment, the elastomer 15 (or elastomer region) extends beyond the display area (shown in FIG. 2) corresponding to the display screen G (shown in FIG. 1A), allowing bubbles generated in the elastomer 15 to be driven from the display area into the nondisplay area so that they do not obstruct the image display.

Further, since the front polarizing plate 13 covers and extends beyond the elastomer region, the precursor of the elastomer 15 (i.e., monomer, prepolymer, etc.) is prevented from attaching to the silicone coating agent 14 and the conductive films 16a and 16b when the elastomer 15 is formed by light curing. This avoids a situation where the silicone coating agent 14 expands due to elastomer material adhering thereto and loses, at least to some extent, its sealing properties, which might permit foreign particles to enter the liquid crystal layer and degrade its characteristics. Further, expansion of the conductive films 16a and 16b due to elastomer material adhering thereto is also avoided, thereby avoiding a reduction in the adherence and conductivity of these films. That is, the present embodiment prevents the swelling, dissolution, etc. of the members adjacent to the liquid crystal panel 120, resulting in improved performance of the image display device.

Second Embodiment

A second embodiment of the present invention and a variation thereof will be described with reference to FIGS. 3A and 3B, respectively, which are enlarged conceptual views of the portion A of FIG. 1B.

The second embodiment and the variation thereof differ from the first embodiment in that they additionally include frame members 29 and 29', respectively, disposed around the elastomer 15. All other components are the same as in the first embodiment and bear the same reference numerals and hence a detailed description of these components will not be provided herein.

Figure 3A:
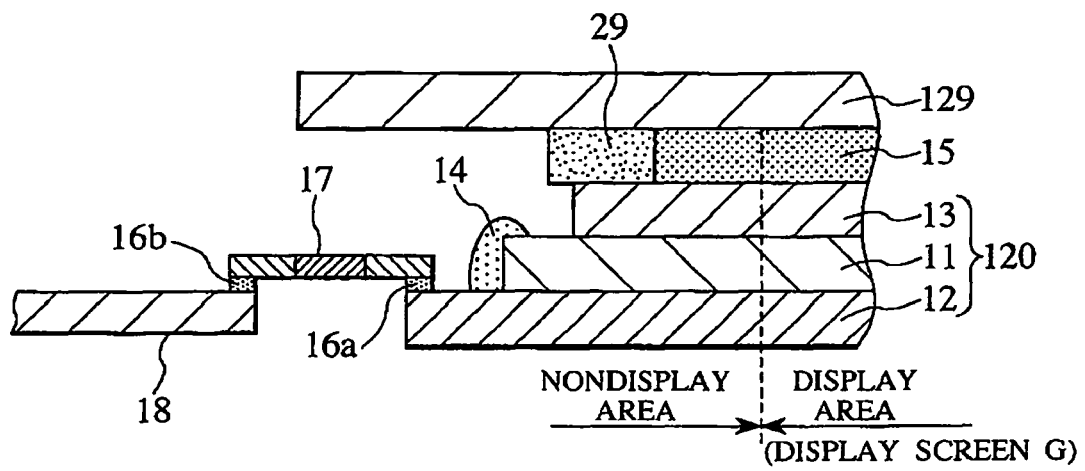
FIG. 3A is an enlarged conceptual view of the portion A of FIG. 1B according to a second embodiment of the present invention.

According to the second embodiment, the frame member 29 (which corresponds to the frame members defined in the appended claims 2 and 3) encloses and seals the periphery of the elastomer 15 and thereby prevents unwanted spread of the elastomer 15 (or its precursor) to adjacent members, as shown in FIG. 3A. It should be noted that the frame member 29 extends outwardly beyond the periphery of the front polarizing plate 13, that is, the frame member 29 protrudes from the outer edge of the front polarizing plate 13. The frame member 29 is made of a sheet-like material impermeable to the precursor of the elastomer 15 (i.e., prepolymer, etc.). Therefore, it is in close surface contact with the protective plate 129, the front polarizing plate 13, and the elastomer 15. Although the frame member 29 has been described as extending around the entire periphery of the elastomer 15 (i.e., enclosing the periphery of the elastomer 15), it is to be understood that the frame member 29 may extend along only one side of the elastomer 15 or a portion of the periphery of the elastomer 15. It may be porous or nonporous, although the former is preferred since porous material can absorb bubbles generated in the elastomer 15. The above "impermeable" material of the frame member 29 may be impermeable to the precursor of the elastomer 15 (i.e., prepolymer, etc.) substantially permanently or until the light curing is completed.

Thus, according to the second embodiment, the frame member 29 encloses and seals the periphery of the elastomer 15 and thereby prevents unwanted spread of the elastomer 15 to adjacent members, resulting in improved performance of the device. Further, if the frame member 29 is made of a porous material, it can absorb bubbles generated in the precursor of the elastomer 15 (i.e., prepolymer, etc.). Since the frame member 29 extends outwardly beyond the periphery of the front polarizing plate 13 and hence has a large volume, it can absorb a large amount of bubbles. That is, the frame member 29 effectively seals the elastomer 15, thereby reliably preventing its unwanted spread to adjacent members.

Figure 3B:
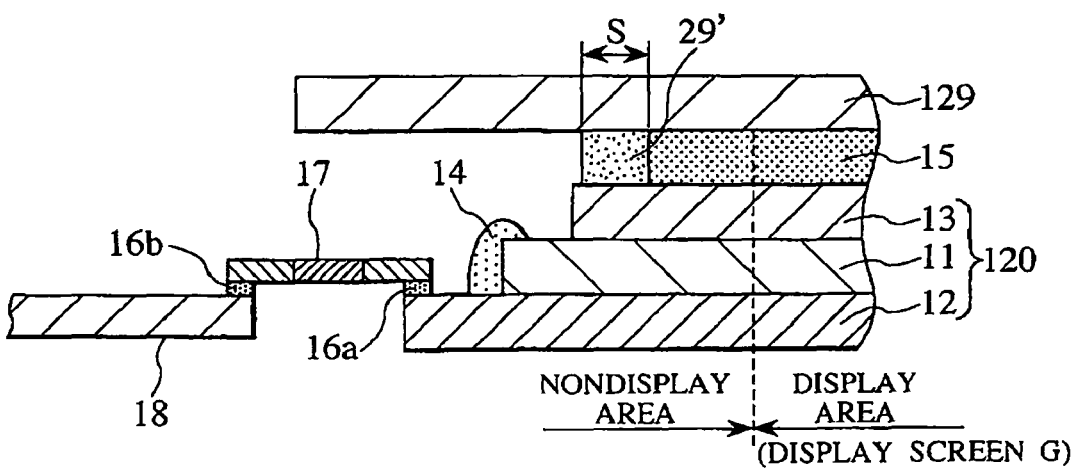
FIG. 3B is an enlarged conceptual view of the portion A of FIG. 1B according to a variation of the second embodiment.

According to the variation of the second embodiment, the frame member 29' (which corresponds to the frame members defined in the appended claims 2 and 4) encloses and seals the periphery of the elastomer 15 and thereby prevents unwanted spread of the elastomer 15 to adjacent members, as shown in FIG. 3B. The frame member 29' is made of a material impermeable to the precursor of the elastomer 15 (i.e., prepolymer, etc.) and extends only a predetermined length S and hence does not extend beyond the edge of the front polarizing plate 13 (see FIG. 3B).

Thus, according to the variation of the second embodiment, the frame member 29' encloses and seals the periphery of the elastomer 15 and thereby prevents unwanted spread of the elastomer 15 to adjacent members, resulting in improved performance of the device. Further, the frame member 29' is made of a material impermeable to the precursor of the elastomer 15 (i.e., prepolymer, etc.) and extends only the predetermined length S and hence does not extend beyond the edge of the front polarizing plate 13. That is, the frame member 29' has a small volume and hence the material cost is low, as compared to the frame member 29 of the second embodiment, allowing a reduction in the cost of the device.

Third Embodiment

A third embodiment of the present invention and a variation thereof will be described with reference to FIGS. 4A and 4B, respectively, which are enlarged conceptual views of the portion A of FIG. 1B.

The third embodiment differs from the second embodiment in that the frame member 29 is replaced by a frame member 39. Further, the variation of the third embodiment differs from the third embodiment in that the frame member 39 is replaced by a frame member 39'. These frame members 39 and 39' are formed in a different manner than the frame members of 29 and 29' described in connection with the second embodiment. All other components are the same as in the second embodiment and bear the same reference numerals and hence a detailed description of these components will not be provided herein.

According to the third embodiment, the frame member 39 (which corresponds to the frame members defined in the appended claims 2 and 5) is made of a material impermeable to the prepolymeric precursor of the elastomer 15 and is formed by dropping such a material from a dispenser onto the surface of the front polarizing plate 13 on the front glass substrate 11 so as to cover a predetermined surface area. The corners of the frame member 39 in contact with the protective plate 129 are round due to the viscosity of the material, as shown in FIG. 4A.

According to the variation of the third embodiment, the frame member 39' (which corresponds to the frame members defined in the appended claims 2 and 5) is also made of a material impermeable to the prepolymeric precursor of the elastomer 15 and is formed by dropping such a material from a dispenser onto the rear surface of the protective plate 129 so as to cover a predetermined surface area. The corners of the frame member 39' in contact with the front polarizing plate 13 on the front glass substrate 11 are round due to the viscosity of the material, as shown in FIG. 4B.

Thus, according to the third embodiment and the variation thereof, since the frame members 39 and 39' are formed by dropping a material through a dispenser, their manufacturing cost is significantly lower (approximately 5- to 10-fold) than when they are formed from sheet material, resulting in a reduction in the cost of the device.

If a sheet material is used to form these frame members, it is necessary to remove and dispose of the release sheets covering the adhesive layer. On the other hand, the formation of the frame members 39 and 39' by use of a dispenser as described above does not require a sheet material and hence disposal of release sheets. That is, this method is environmentally friendly and allows the production line to be maintained in a clean state.

Fourth Embodiment

Figure 5A:
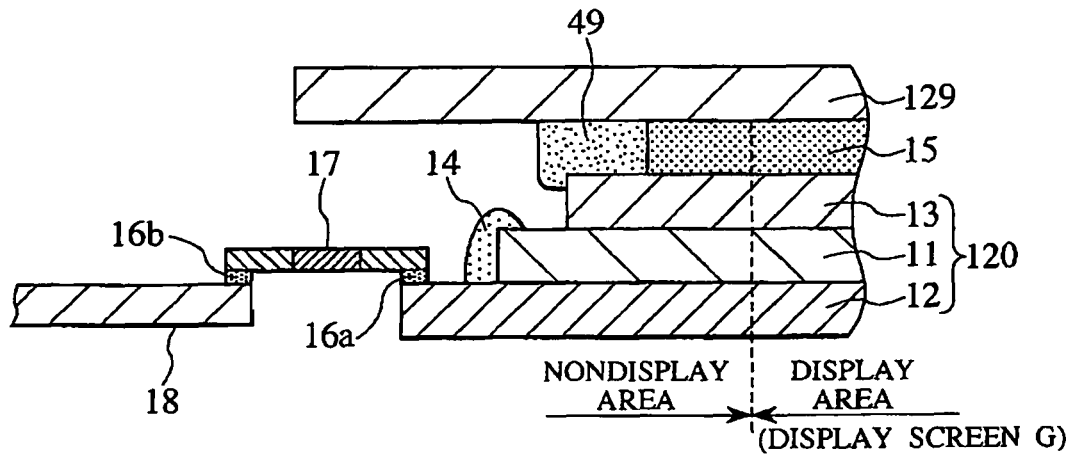
FIG. 5A is an enlarged conceptual view of the portion A of FIG. 1B according to a fourth embodiment of the present invention.
Figure 5B:
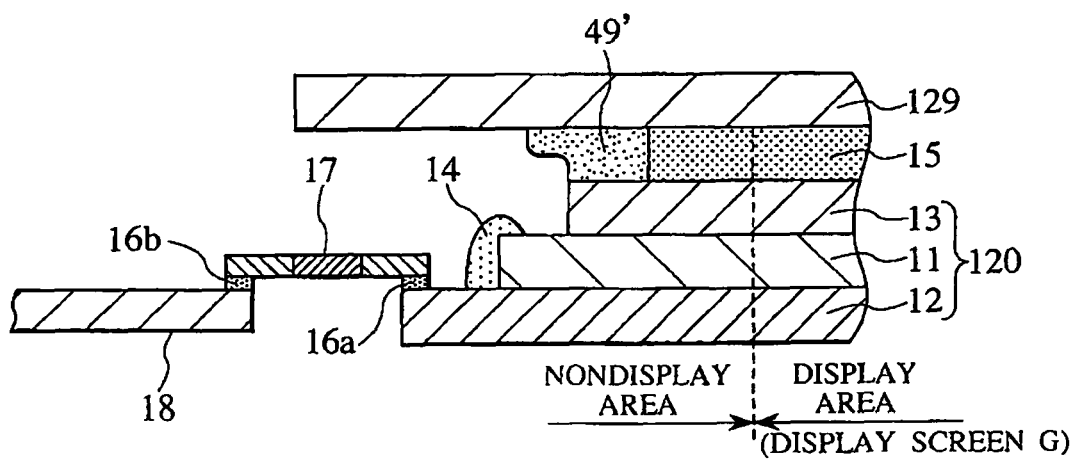
FIG. 5B is an enlarged conceptual view of the portion A of FIG. 1B according to a variation of the fourth embodiment.

A fourth embodiment of the present invention and a variation thereof will be described with reference to FIGS. 5A and 5B, respectively, which are enlarged conceptual views of the portion A of FIG. 1B.

The fourth embodiment differs from the third embodiment in that the frame member 39 is replaced by a frame member 49. Further, the variation of the fourth embodiment differs from the fourth embodiment in that the frame member 49 is replaced by a frame member 49'. These frame members 49 and 49' are formed in a different manner than the frame members 39 and 39' described in connection with the third embodiment. All other components are the same as in the third embodiment and bear the same reference numerals and hence a detailed description of these components will not be provided herein.

According to the fourth embodiment, the frame member 49 (which corresponds to the frame members defined in the appended claims 2, 3, and 5) is nonporous and is made of a material impermeable to the prepolymeric precursor of the elastomer 15. This frame member is formed by dropping such a material from a dispenser onto the rear surface of the protective plate 129 so as to cover a predetermined surface area, as shown in FIG. 5A. It should be noted that the frame member 49 is formed to extend beyond the edge of the front polarizing plate 13. The protruding portion of the frame member 49 partially covers the edge of the front polarizing plate 13 due to the elasticity or viscosity of the material, as shown in FIG. 5A.

According to the variation of the fourth embodiment, the frame member 49' (which corresponds to the frame members defined in the appended claims 2, 3, and 5) is also nonporous and is made of a material impermeable to the prepolymeric precursor of the elastomer 15. This frame member is formed by dropping such a material from a dispenser onto the surface of the front polarizing plate 13 on the front glass substrate 11 so as to cover a predetermined surface area. It should be noted that the frame member 49' contacts the rear surface of the protective plate 129 and extends beyond and overhangs the edge of the front polarizing plate 13 due to the elasticity or viscosity of the material, as shown in FIG. 5B.

Thus, according to the fourth embodiment and the variation thereof, the frame members 49 and 49' are made of a nonporous material and formed between the front polarizing plate 13 and the protective plate 129 so as to extend beyond the edge of the front polarizing plate 13. This arrangement allows the portion of the elastomer 15 in the nondisplay area to be increased, and bubbles generated in the elastomer 15 can be driven into this portion so that they do not obstruct the image display on the display screen G.

Fifth Embodiment

A fifth embodiment of the present invention and a variation thereof will be described with reference to FIGS. 6A and 6B, respectively, which are enlarged conceptual views of the portion A of FIG. 1B.

The fifth embodiment differs from the third embodiment in that the frame member 39 is replaced by a frame member 59. Further, the variation of the fifth embodiment differs from the fifth embodiment in that the frame member 59 is replaced by a frame member 59'. These frame members 59 and 59' include particles 58 and 58', respectively, as spacers. All other components are the same as in the third embodiment and bear the same reference numerals and hence a detailed description of these components will not be provided herein.

Figure 6A:
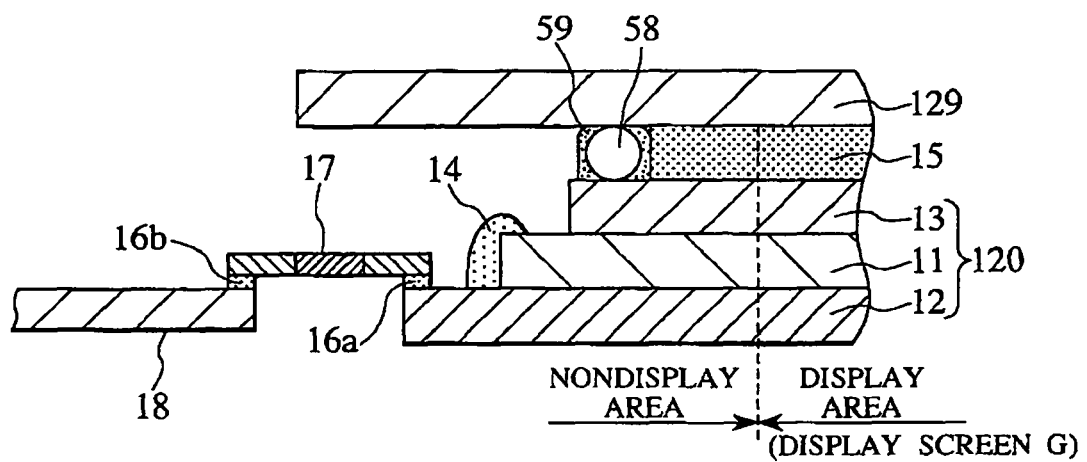
FIG. 6A is an enlarged conceptual view of the portion A of FIG. 1B according to a fifth embodiment of the present invention.

According to the fifth embodiment, the frame member 59 is formed of a material impermeable to the prepolymeric precursor of the elastomer 15 and includes a spherical particle 58 having a diameter substantially equal to the desired thickness of the frame member 59 (or the elastomer 15), as shown in FIG. 6A. This particle 58 serves as a spacer to allow the frame member 59 to have a substantially uniform thickness. The frame member 59 is formed by dropping a material from a dispenser onto the surface of the front polarizing plate 13 on the front glass substrate 11 so as to cover a predetermined surface area. The corners of the frame member 59 in contact with the protective plate 129 are round due to the viscosity of the material, as shown in FIG. 6A.

In this embodiment, the elastomer 15 (which is transparent) may be formed in the following manner. First, the particle 58 is inserted between the protective plate 129 and the front polarizing plate 13. Next, the space between the protective plate 129 and the front polarizing plate 13 is filled with the precursor of the elastomer 15. This allows the transparent elastomer 15 to be formed to a controlled thickness. It should be noted that the particle 58 may be mixed in the precursor of the transparent elastomer 15 before the precursor is applied to fill the space between the protective plate 129 and the front polarizing plate 13. Further, the particle 58 may be of any shape that allows the elastomer 15 to have the desired thickness. That is, the particle 58 may have a spherical, oval, or cylindrical shape, etc., although spherical shapes are preferred since they require no orientation for assembly.

Figure 6B:
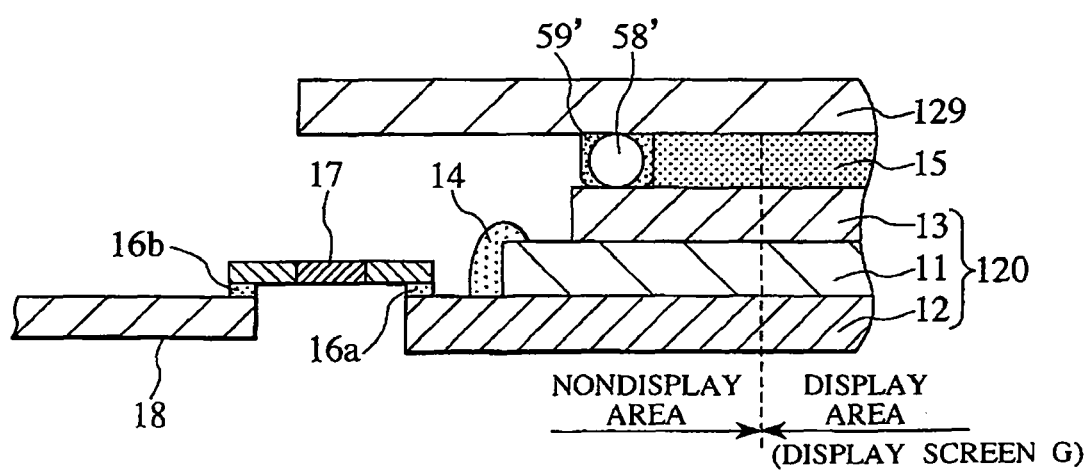
FIG. 6B is an enlarged conceptual view of the portion A of FIG. 1B according to a variation of the fifth embodiment.

According to the variation of the fifth embodiment, the frame member 59' is also formed of a material impermeable to the prepolymeric precursor of the elastomer 15 and includes a spherical particle 58' having a diameter substantially equal to the desired height, or thickness, of the frame member 59' (or the elastomer 15), as shown in FIG. 6B. This particle serves a spacer to allow the frame member 59' to have a substantially uniform height, or thickness. The frame member 59' is formed by dropping a material from a dispenser onto the rear surface of the protective plate 129 so as to cover a predetermined surface area. The corners of the frame member 59' in contact with the front polarizing plate 13 on the front glass substrate 11 are round due to the viscosity of the material, as shown in FIG. 6B. All other components are the same as those shown in FIG. 5A, and a detailed description thereof will not be provided herein.

Thus, according to the fifth embodiment and the variation thereof, the frame members 59 and 59' include particles 58 and 58', respectively, having a diameter substantially equal to the desired thickness of the frame members. These particles 58 and 58' serve as spacers to allow their respective frame members 59 and 59' to have a substantially uniform thickness. Thus, the present embodiment makes it easy to form the frame members 59 and 59' to the desired thickness.

Figure 4A:
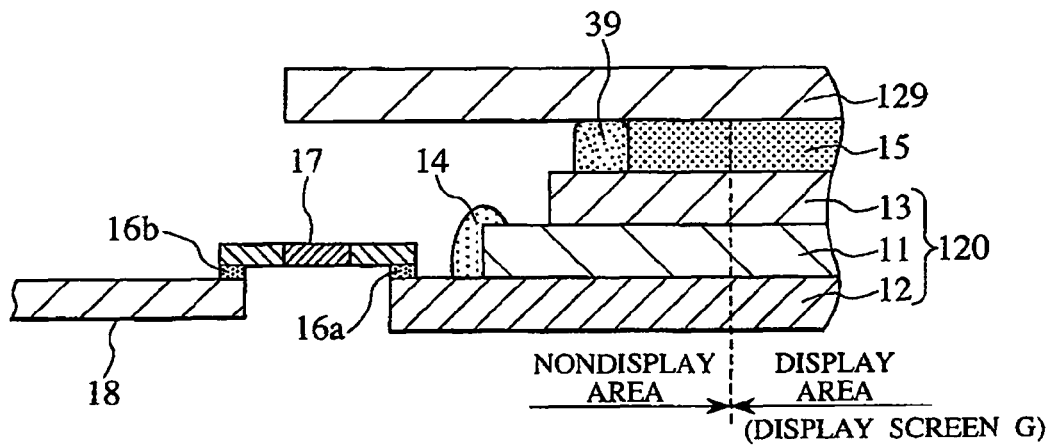
FIG. 4A is an enlarged conceptual view of the portion A of FIG. 1B according to a third embodiment of the present invention.
Figure 4B:
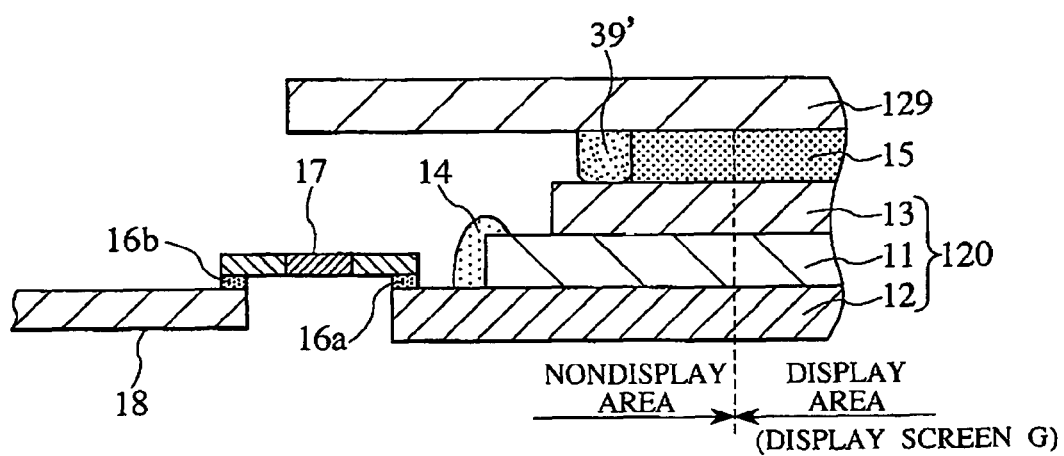
FIG. 4B is an enlarged conceptual view of the portion A of FIG. 1B according to a variation of the third embodiment.

The fifth embodiment and the variation thereof have been described as applied to configurations such as that of the third embodiment (shown in FIG. 4A). That is, in such configurations, the frame members 59 and 59' include particles 58 and 58, respectively, having a diameter substantially equal to the desired thickness of the frame members. These particles 58 and 58' serve as spacers to allow their respective frame members 59 and 59' to have a substantially uniform thickness. It should be noted, however, that the configurations of the first, second, and fourth embodiments may include the particle 58 or 58' disposed in the manner described above.

Further, the frame members of the second to fifth embodiments may be made porous on the inner side and nonporous on the outer side and formed to extend along at least one side of the elastomer 15 or a portion of the periphery of the elastomer 15. This allows the porous inner side to absorb bubbles generated in the elastomer 15 while allowing the nonporous outer side to prevent unwanted spread of the elastomer 15 to adjacent members. As a result, no bubbles are present within the display screen G to obstruct the image display. Further, the elastomer 15 is prevented from spreading to members adjacent to the liquid crystal panel.

Further, the frame members of the second to fifth embodiments may be made of a transparent resin, which enhances the appearance and design of the image display device (or liquid crystal TV) since other members adjacent the display screen G are also transparent.

Alternatively, the frame members of the second to fifth embodiments may be black in color, which also enhances the appearance and design of the image display device (or liquid crystal TV) since the liquid crystal panel 120 is also blackish, that is, the frame members do not stand out from the liquid crystal panel 120.

Sixth Embodiment

A sixth embodiment of the present invention will be described with reference to FIG. 7, which is an enlarged conceptual view of the portion A of FIG. 1B.

Unlike the second to fifth embodiments, the sixth embodiment does not include a frame member enclosing the periphery of the elastomer 15, but instead includes a coating agent (or protective member) 68. Further, as shown in FIG. 7, the surface 63a of the front polarizing plate 63 in contact with the elastomer 15 (which corresponds to the outer surface defined in the appended claim 13) is provided with irregularities. All other components are the same as in the first embodiment and bear the same reference numerals and hence a detailed description of these components will not be provided herein.

Figure 7:
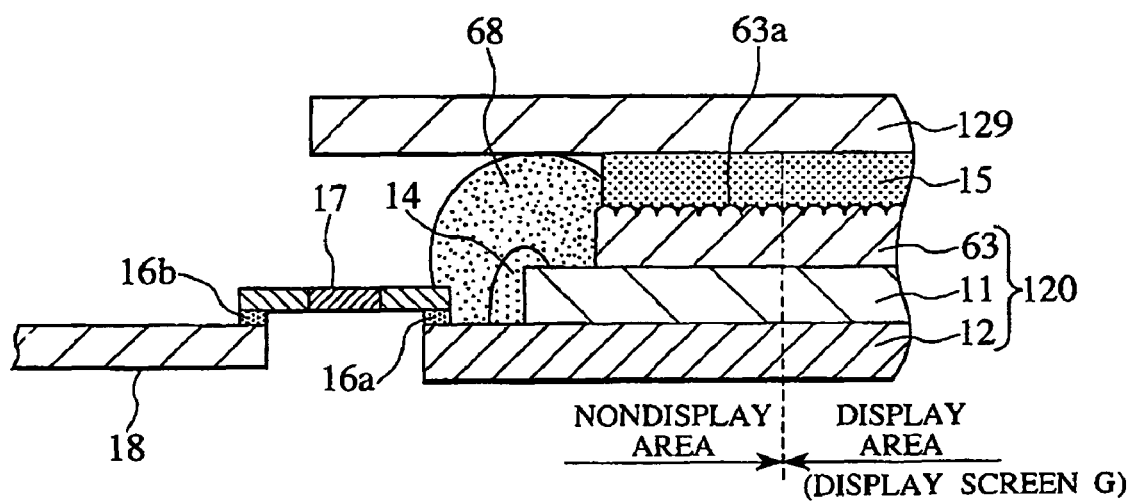
FIG. 7 is an enlarged conceptual view of the portion A of FIG. 1B according to a sixth embodiment of the prevent invention.

Thus, according to the sixth embodiment, the surface 63a of the front polarizing plate 63 in contact with the elastomer 15 is provided with irregularities to increase its surface area, as shown in FIG. 7. This increases the contact area and enhances adhesion between the front polarizing plate 63 and the elastomer 15. Further, the coating agent 68 covers the cut edge of the front polarizing plate 63, the silicone coating agent 14, etc., as well as enclosing and sealing the elastomer 15 between the protective plate 129 and the front polarizing plate 63.

Thus, according to the sixth embodiment, the surface 63a of the front polarizing plate 63 in contact with the elastomer 15 is provided with irregularities to increase the contact area and enhance adhesion between the front polarizing plate 63 and the elastomer 15, thereby preventing unwanted spread of the elastomer 15 to adjacent members. Further, the coating agent 68 covers the cut edge of the front polarizing plate 63, the silicone coating agent 14, etc., as well as enclosing and sealing the elastomer 15 between the protective plate 129 and the front polarizing plate 63. This prevents the elastomer 15 from spreading and attaching to adjacent members, such as the cut edge of the front polarizing plate 63, the silicone coating agent 14, etc. As a result, degradation of the adjacent members due to the spread of the elastomer 15 is avoided, thereby maintaining the performance of the device.

Seventh Embodiment

A seventh embodiment of the present invention and a variation thereof will be described with reference to FIGS. 8A and 8B, respectively, which are enlarged conceptual views of the portion A of FIG. 1B.

The seventh embodiment will now be described. Unlike the second to fifth embodiments, the seventh embodiment does not include a frame member enclosing the periphery of the elastomer 15, and unlike the sixth embodiment, it does not include the coating agent 68. Instead, as shown in FIG. 8A, the rear surface 129a of the protective plate 129 in contact with the elastomer 15 is modified, and the surface of the front polarizing plate 73 in contact with the elastomer 15 is provided with irregularities. All other components are the same as in the first embodiment and bear the same reference numerals and hence a detailed description of these components will not be provided herein.

Figure 8A:
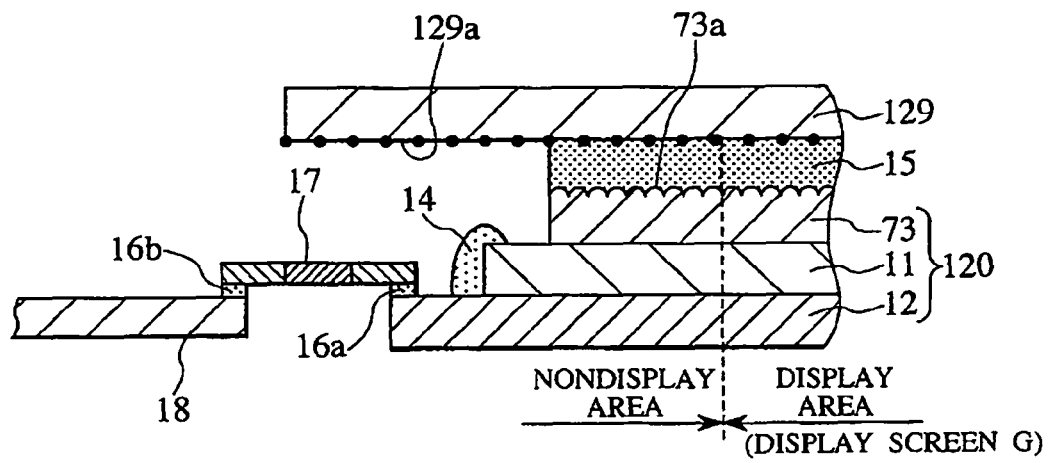
FIG. 8A is an enlarged conceptual view of the portion A of FIG. 1B according to a seventh embodiment of the present invention.
Figure 8B:
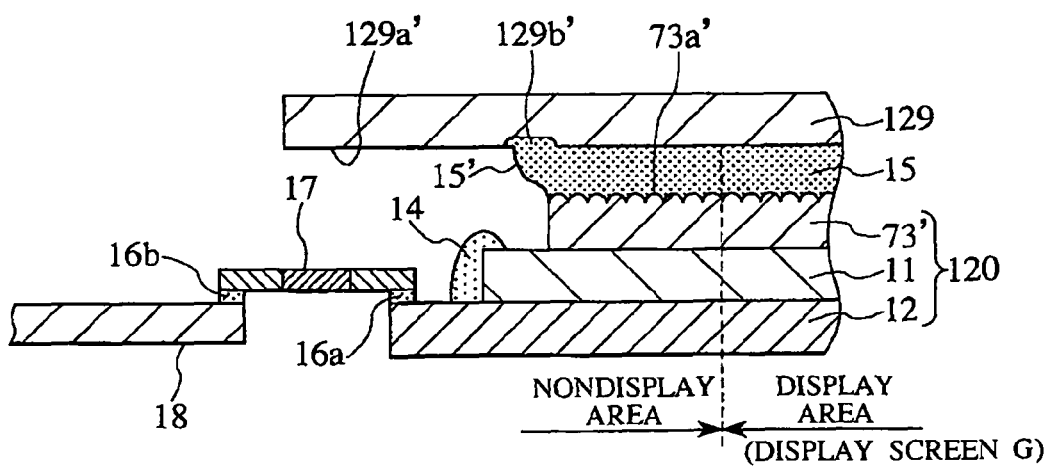
FIG. 8B is an enlarged conceptual view of the portion A of FIG. 1B according to a variation of the seventh embodiment.

According to the seventh embodiment, the surface 73a of the front polarizing plate 73 in contact with the elastomer 15 (which corresponds to the outer surface defined in the appended claim 13) is provided with irregularities to increase its surface area, as shown in FIG. 8A. This increases the contact area and enhances adhesion between the front polarizing plate 73 and the elastomer 15. Further, the rear surface 129a of the protective plate 129 in contact with the elastomer 15 (which corresponds to the outer surface defined in the appended claim 15) is modified by UV (ultraviolet) treatment or by causing plasma to collide with the surface (i.e., by plasma treatment) to provide the surface 129a with irregularities on the order of angstroms. This increases the contact area and enhances adhesion between the protective plate 129 and the elastomer 15.

Thus, according to the seventh embodiment, the rear surface 129a of the protective plate 129 and the surface 73a of the front polarizing plate 73 are provided with irregularities to increase their surface areas (these surfaces being in contact with the elastomer 15). This increases the contact area and enhances adhesion between the protective plate 129 and the elastomer 15 and between the front polarizing plate 73 and the elastomer 15; thereby preventing unwanted spread of the elastomer 15 to adjacent members. As a result, degradation of the adjacent members due to elastomer material adhering thereto is avoided, thereby improving the performance of the device.

The variation of the seventh embodiment will now be described. Unlike the second to fifth embodiments, the variation of the seventh embodiment does not include a frame member enclosing the periphery of the elastomer 15, and unlike the sixth embodiment, it does not include the coating agent 68. Instead, the rear surface 129a' of the protective plate 129 in contact with the elastomer 15 has formed therein a concave slit, or groove, 129b' (which corresponds to the concave portion defined in the appended claim 14) for receiving and retaining leaked elastomer 15', as shown in FIG. 8B. Furthermore, the surface 73a' of the front polarizing plate 73' in contact with the elastomer 15 (which corresponds to the outer surface defined in the appended claim 13) is provided with irregularities. All other components are the same as in the first embodiment and bear the same reference numerals and hence a detailed description of these components will not be provided herein.

Thus, according to the variation of the seventh embodiment, the rear surface 129a' of the protective plate 129 in contact with the elastomer 15 has formed therein the slit 129b' for trapping leaked elastomer 15'. It should be noted that this concave slit 129b' may extend along the entire periphery of the elastomer 15 or a portion thereof.

Further, the surface 73a' of the front polarizing plate 73' in contact with the elastomer 15 is provided with irregularities to increase the contact area and enhance adhesion between the front polarizing plate 73' and the elastomer 15.

According to the variation of the seventh embodiment, the concave slit 129b' formed in the rear surface 129a' of the protective plate 129 automatically receives and retains leaked elastomer 15' (if any) escaped from between the protective plate 129 and the front polarizing plate 73', by virtue of the surface tension of the escaped elastomer, thus preventing unwanted spread of the elastomer 15 to adjacent members.

Further, the surface 73a' of the front polarizing plate 73' in contact with the elastomer 15 is provided with irregularities to increase the contact area and enhance adhesion between the front polarizing plate 73' and the elastomer 15, thereby further preventing unwanted spread of the elastomer 15 to adjacent members. As a result, degradation of the adjacent members due to elastomer material adhering thereto is avoided, thereby improving the performance of the device. Although in FIGS. 8A and 8B the elastomer 15 and the front polarizing plates 73 and 73' have the same size, it is to be understood that they may have different sizes while retaining the advantages described above.

Eighth Embodiment

Figure 9A:
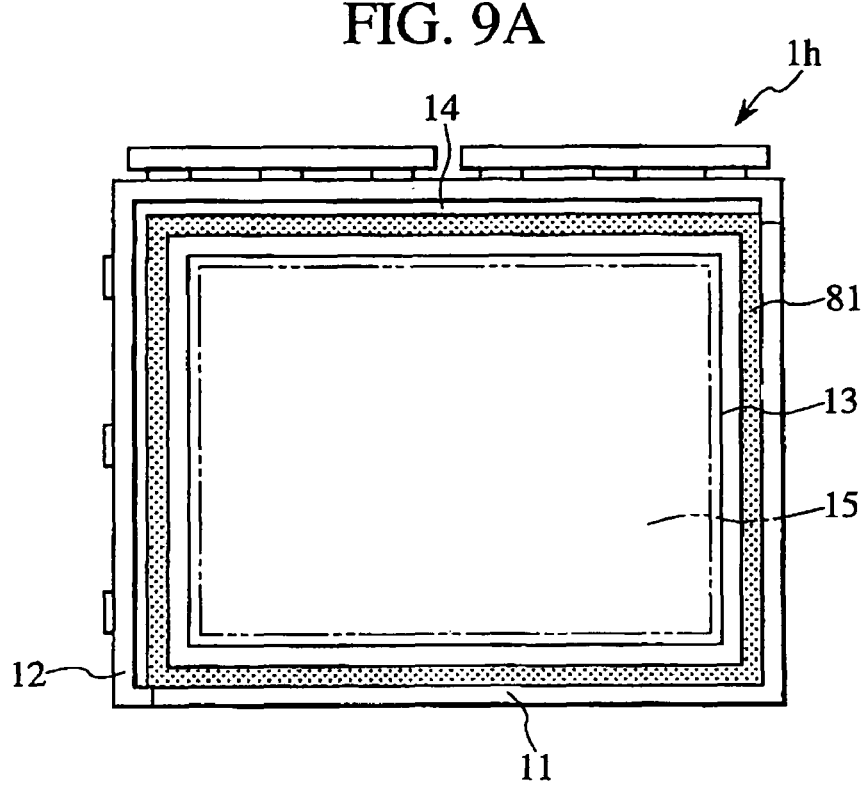
FIG. 9A is a conceptual front view of the image display unit of FIG. 1A according to an eighth embodiment of the present invention.
Figure 9B:
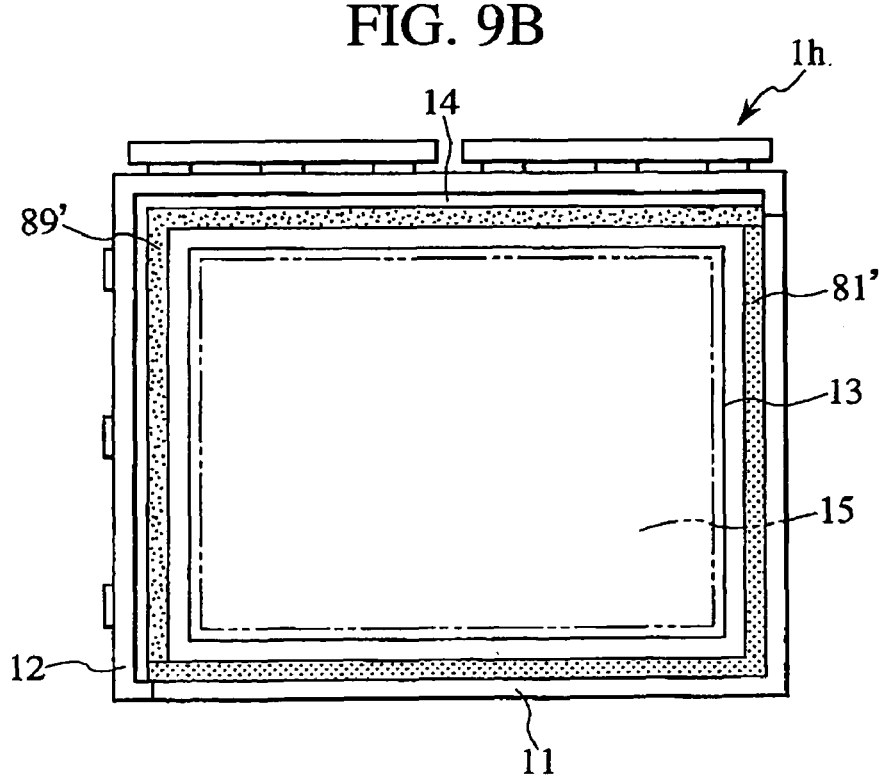
FIG. 9B is a conceptual front view of the image display unit of FIG. 1A according to a variation of the eighth embodiment.

An eighth embodiment of the present invention and a variation thereof will be described with reference to FIGS. 9A and 9B, respectively, which are conceptual front views of the image display unit 1h of FIG. 1A. It should be noted that FIGS. 9A and 9B do not show the protective plate 129.

The eighth embodiment will now be described. Referring to FIG. 9A and FIG. 2, a front glass substrate 11 is disposed on a rear glass substrate 12 with a crystal liquid layer, a color filter, etc. (not shown) therebetween. An elastomer 15 is disposed on the front glass substrate 11. Further, an odor blocking layer (or shield) 81 extends along and on the four sides of the glass substrates 11 and 12 so as to enclose and seal the elastomer 15. This odor blocking layer 81 is made of a resin, etc. that allows it to serve as a shield against the odor of the elastomer 15. It should be noted that the odor blocking layer 81 can be applied whether or not the image display device includes a frame member such as described above.

It should be noted that when the entire frame member is porous, the odor of the elastomer 15 might spread, though gradually, through the porous structure of the frame member to the outside. In such a case, the odor blocking layer 81 should preferably be formed along the periphery of the frame member to block the odor of the elastomer 15 from spreading to the outside.

Thus, according to the eighth embodiment, the odor blocking layer 81 is formed along the four sides of the elastomer 15, thereby blocking the odor of the elastomer 15 from spreading to the outside.

The variation of the eighth embodiment will now be described. Referring to FIG. 9B and FIG. 3, a front glass substrate 11 is disposed on a rear glass substrate 12 with a crystal liquid layer, a color filter, etc. (not shown) therebetween. A front polarizing plate 13 is disposed on the front glass substrate 11, and an elastomer 15 is disposed on the front polarizing plate 13. Further, a nonporous frame member 89' extends along and on the upper and left sides (as viewed in FIG. 9B) of the glass substrates 11 and 12, and an odor blocking layer (or shield) 81' extends along and on the other sides (the lower and right sides as viewed in FIG. 9B) of the glass substrates 11 and 12. The frame member 89' is similar to the frame member 29 of the second embodiment shown in FIG. 3A. The odor blocking layer 81' is made of a resin, etc. that allows it to serve as a shield against the odor of the elastomer 15. The frame member 89' and the odor blocking layer 81' together enclose and seal the elastomer 15, as shown in FIG. 9B.

Thus, according to the variation of the eighth embodiment, the nonporous frame member 89' is formed along two sides of the elastomer 15, and the odor blocking layer 81' is formed along the other two sides of the elastomer 15 to block the odor of the elastomer 15 from spreading to the outside.

It should be noted that the odor blocking layers 81 and 81' may be selectively formed where penetration of the odor of the elastomer 15 might occur, as described above.

Ninth Embodiment

A ninth embodiment of the present invention and first to third variations thereof will be described with reference to FIGS. 10A to 10D, respectively, which are enlarged conceptual cross-sectional views of the front polarizing plate in the portion A of FIG. 1B.

Figure 10A:
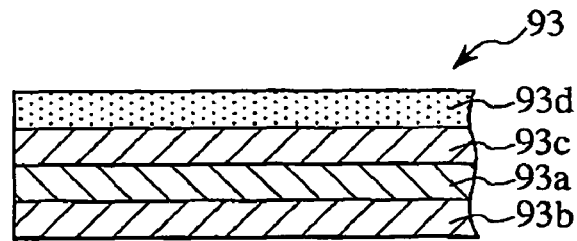
FIG. 10A is an enlarged conceptual cross-sectional view of the front polarizing plate in the portion A of FIG. 1B according to a ninth embodiment of the present invention.

The ninth embodiment will now be described. Referring to FIG. 10A, a front polarizing plate 93 is shown which includes: a PVA (polyvinyl alcohol)/iodine layer 93a in which iodine molecules are arranged in an orderly fashion; a lower TAC (triacetyl cellulose) layer 93b and an upper TAC layer 93c sandwiching the PVA/iodine layer 93a therebetween; and a barrier layer 93d disposed on the upper TAC layer 93c and in contact with the elastomer 15.

The barrier layer 93d is made of a resin material impermeable to the prepolymeric precursor of the elastomer 15, such as acrylic containing silica particles or PET (polyethylene terephthalate). An AG (anti-glare) treatment, an AR (anti-reflection) treatment, etc. are applied to the barrier layer 93d to block the elastomer 15 from spreading to the TAC layer 93c and the PVA/iodine layer 93a. It should be further noted that the barrier layer 93d need be transparent.

Thus, according to the ninth embodiment, the front polarizing plate 93 includes the barrier layer 93d which is in contact with the elastomer 15 and made of a material impermeable to the prepolymeric precursor of the elastomer 15, thereby preventing penetration of the prepolymer into the surface of the front polarizing plate 93.

Figure 10B:
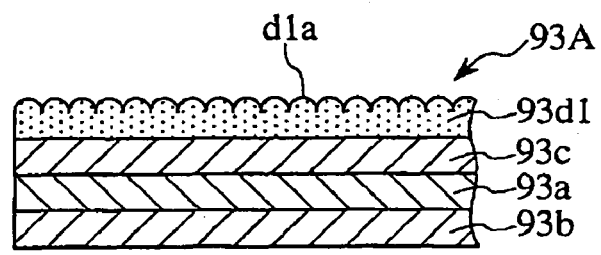
FIG. 10B is an enlarged conceptual cross-sectional view of the front polarizing plate in the portion A of FIG. 1B according to a first variation of the ninth embodiment.

The first variation of the ninth embodiment will now be described. Referring to FIG. 10B, a front polarizing plate 93A is shown which includes a barrier layer 93d1 formed on the TAC layer 93c. This barrier layer 93d1 is impermeable to the prepolymer, and its outer surface d1a is provided with irregularities to increase the area of the surface. All other components are the same as in the ninth embodiment and bear the same reference numerals and hence a detailed description of these components will not be provided herein.

Thus, according to the first variation of the ninth embodiment, the barrier layer 93 d1 of the front polarizing plate 93A in contact with the elastomer 15 is impermeable to the prepolymer, preventing penetration of the prepolymer into the surface of the front polarizing plate 93A. Further, the outer surface d1a of the barrier layer 93d1 in contact with the elastomer 15 is provided with irregularities to increase its surface area. This increases the contact area and enhances adhesion between the barrier layer 93d1 and the elastomer 15, thereby preventing unwanted spread of the elastomer 15.

Figure 10C:
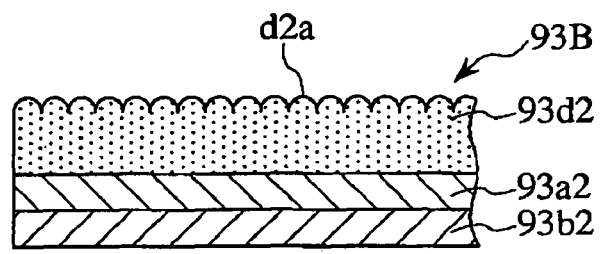
FIG. 10C is an enlarged conceptual cross-sectional view of the front polarizing plate in the portion A of FIG. 1B according to a second variation of the ninth embodiment.

The second variation of the ninth embodiment will now be described. Referring to FIG. 10C, a front polarizing plate 93B is shown which includes a layer 93b2 instead of the TAC layer 93b of the front polarizing plate 93 of the ninth embodiment. The layer 93b2 is made of a material impermeable to the prepolymeric precursor of the elastomer 15, for example, a cyclic polyolefin such as ZEONOR®. A PVA/iodine layer 93a2 is formed on the layer 93b2, and a barrier layer 93d2 impermeable to the prepolymer is formed on the PVA/iodine layer 93a2. The outer surface d2a of the barrier layer 93d2 is provided with irregularities to increase its surface area. It should be noted that the barrier layer 93d2 may be made up of two layers of different materials: the upper layer having the irregular outer surface d2a; and the lower layer having a smooth outer surface.

Thus, according to the second variation of the ninth embodiment, the barrier layer 93d2 of the front polarizing plate 93B in contact with the elastomer 15 is impermeable to the prepolymer, preventing penetration of the prepolymer into the surface of the front polarizing plate 93B. Further, the outer surface d2a of the barrier layer 93d2 in contact with the elastomer 15 is provided with irregularities to increase its surface area. This increases the contact area and enhances adhesion between the barrier layer 93d2 and the elastomer 15, thereby preventing unwanted spread of the elastomer 15.

Figure 10D:
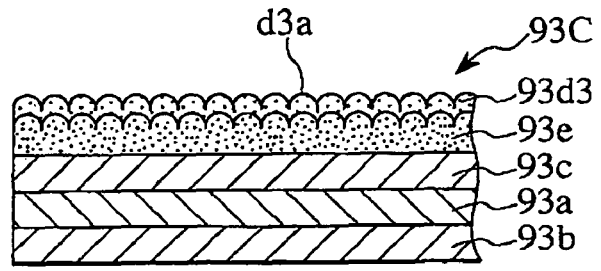
FIG. 10D is an enlarged conceptual cross-sectional view of the front polarizing plate in the portion A of FIG. 1B according to a third variation of the ninth embodiment.

The third variation of the ninth embodiment will now be described. Referring to FIG. 10D, a front polarizing plate 93C is shown which includes a layer 93e formed on the TAC layer 93c. This layer 93e has irregularities formed in its surface. Further, a barrier layer 93d3 impermeable to the prepolymeric precursor of the elastomer 15 is formed on the layer 93e. The outer surface d3a of the barrier layer 93d3 is provided with irregularities to increase its surface area. All other components are the same as in the ninth embodiment and bear the same reference numerals and hence a detailed description of these components will not be provided herein.

Thus, according to the third variation of the ninth embodiment, the layer 93e disposed on the TAC layer 93c has good adhesion to the barrier layer 93d3, since the layer 93e has irregularities in its surface. Further, the barrier layer 93d3 of the front polarizing plate 93C in contact with the elastomer 15 is impermeable to the prepolymer, preventing penetration of the prepolymer into the surface of the front polarizing plate 93C. Still further, the outer surface d3a of the barrier layer 93d3 in contact with the elastomer 15 is provided with irregularities to increase its surface area. This increases the contact area and enhances adhesion between the barrier layer 93d3 and the elastomer 15, thereby preventing unwanted spread of the elastomer 15. It should be noted that the above barrier layers 93d, 93d1, 93d2, and 93d3 may be comprised of a transparent base material having a refractive index of 1.5 to reduce interface reflection and thereby provide clear screen display.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. An image display device comprising:
   a backlight unit;
   a liquid crystal panel for displaying an image on a display screen and including a rear polarizing plate, a pair of front and rear transparent glass substrates holding therebetween a liquid crystal layer, electrodes for applying a voltage to said liquid crystal layer, an alignment layer, and a color filter, and a front polarizing plate;
   a transparent protective plate;
   a bonding layer disposed between and bonding said transparent protective plate and said liquid crystal panel; and
   a frame member disposed outside said display area of said display screen and enclosing and sealing said bonding layer;
   wherein said bonding layer is larger in area than the display area of said display screen and smaller in area than said front polarizing plate; and
   wherein an inner side of said frame member is made of a porous material.

2. The image display device as claimed in claim 1, wherein said frame member is formed to extend outwardly beyond the periphery of said front polarizing plate.

3. The image display device as claimed in claim 1, wherein said frame member is formed not to extend outwardly beyond the periphery of said front polarizing plate.

4. The image display device as claimed in claim 1, wherein said frame member is formed by using drawing means.

5. The image display device as claimed in claim 1, wherein said bonding layer includes a spacer having a dimension equal to a thickness of said bonding layer.

6. The image display device as claimed in claim 1, wherein an outer side of said frame member is made of a nonporous material.

7. The image display device as claimed in claim 1, wherein said frame member is transparent or black in color.

8. The image display device as claimed in claim 1, further comprising a protective member that covers the joined peripheries of said pair of glass substrates, the periphery of said front polarizing plate, and the periphery of said bonding layer.

9. The image display device as claimed in claim 1, further comprising a shield formed along at least a portion of the periphery of said bonding layer, said shield sealing said bonding layer from the outside.

10. The image display device as claimed in claim 1, wherein said front polarizing plate includes a barrier layer for preventing penetration of the material of said bonding layer into said front polarizing plate.

11. The image display device as claimed in claim 10, wherein said barrier layer is composed of a transparent base material having a refractive index of 1.5.

12. The image display device as claimed in claim 1, wherein said front polarizing plate is formed such that an outer surface thereof in contact with said bonding layer has surface irregularities.

13. The image display device as claimed in claim 12, wherein said protective plate has a concave portion formed in an outer surface thereof in contact with said bonding layer to receive and retain leaked bonding layer material.

14. The image display device as claimed in claim 1, wherein said protective plate is formed such that an outer surface thereof in contact with said bonding layer has surface irregularities.

* * * * *